Figure 1:
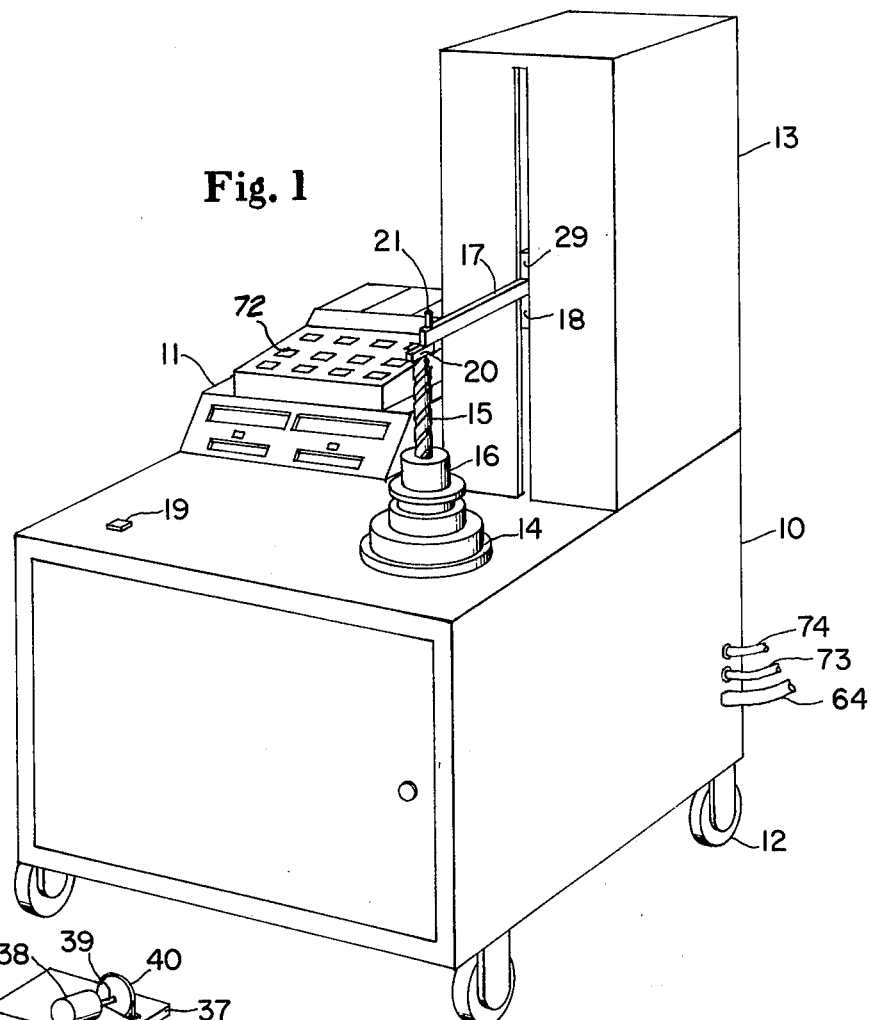

United States Patent [19]

Kaesemeyer

[11] 4,031,628
[45] June 28, 1977

[54] ELECTRONIC TOOL GAGE

[76] Inventor: Carl W. Kaesemeyer, 2605 Marlington Ave., Cincinnati, Ohio 45208

[22] Filed: July 8, 1975

[21] Appl. No.: 594,124

[52] U.S. Cl. .................................. 33/201; 33/172 E
[51] Int. Cl.² ....................................... G01B 5/02
[58] Field of Search ............ 33/172 E, 1 M, 125 C, 33/201, 169 R, 125 A

[56] References Cited
UNITED STATES PATENTS

| | | |
|---|---|---|
| 3,597,093 | 8/1971 | Wolf .................................. 33/201 |
| 3,888,015 | 6/1975 | Williams .......................... 33/185 R |
| 3,920,971 | 11/1975 | Bevis et al. .................... 235/151.11 |

FOREIGN PATENTS OR APPLICATIONS

| | | | |
|---|---|---|---|
| 629,285 | 10/1961 | Canada ........................... 33/125 C |
| 1,108,792 | 4/1968 | United Kingdom ............. 33/172 E |

*Primary Examiner*—William D. Martin, Jr.

[57] ABSTRACT

An electronic tool gage for measuring the diameter and length of metal cutting tools useful in the operation of numerically controlled or data programmed machine tools having tools stored in a matrix including recordable devices after measurement.

1 Claim, 15 Drawing Figures

U.S. Patent June 28, 1977 4,031,628

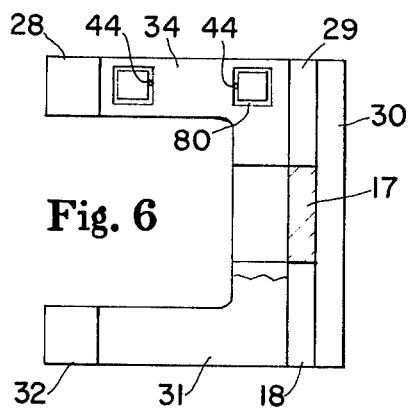
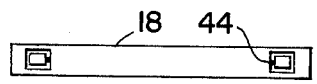
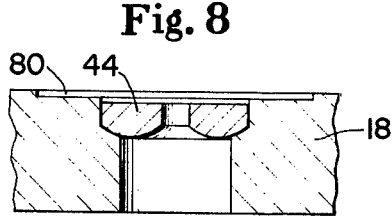
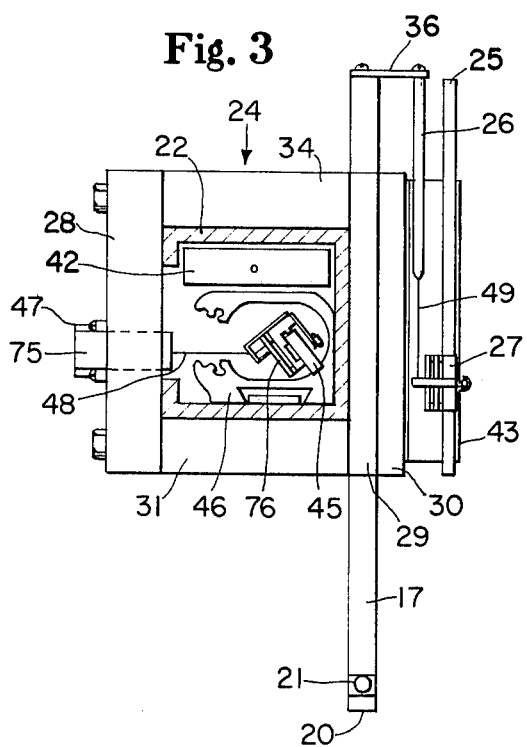
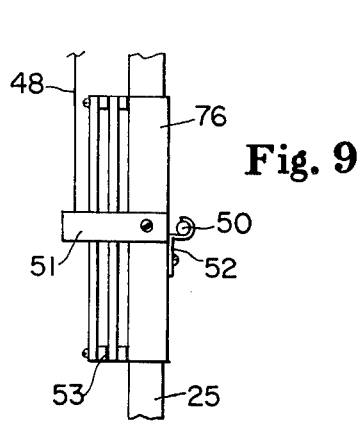
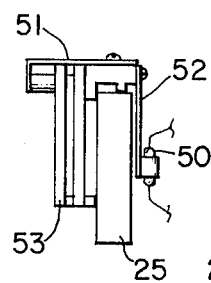
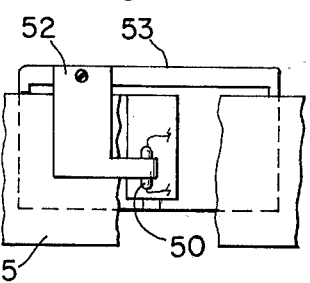

ELECTRONIC TOOL GAGE

My invention relates to an electronic tool gage for measuring the length and/or diameter of metal cutting tools, especially when such tool are used in conjunction with numerically controlled or data programmed devices.

Prior to my invention in one method currently used, the programmer prepares a tool instruction sheet specifying the required tool lengths. A tool setter assembles the various elements of the present tool. The tool setter uses a mechanical or optical gage to measure the tool length. The tool setter sends the tools in a cart to the operator with a list of the tool numbers and their lengths.

Another method now employed is to set the tool length on the machine. In that method the properly selected tool is inserted in the spindle by addressing the appropriate "T" word and doing a tool change. Next he moves the "Z" slide forward using Z axis handwheel while holding feeler gage between the tool and the workpiece until tool just contacts the feeler. At this point he notes the Z axis readout and sets tool length compensation switches, retracts the Z slide and returns the tool to the tool drum and then inserts the next tool in the spindle and repeats this process for each tool.

Still another method employs a cast iron base to support a tool socket and a spaced column using precision washers supporting a snap-on depth micrometer. The column washers are counted by the operator plus the depth micrometer reading and this reading is entered into the proper manually controlled tool compensation switches. This is repeated for each tool and each tool has its assigned storage pocket and tool compensation switches.

My invention not only provides for an economical method and device for electronically measuring the tools but eliminates costly devices as well as reducing the time necessary to achieve the ultimate in accuracy. In less than 15 seconds per tool, I accomplish with my invention the results heretofore obtained in three minutes. All of the foregoing methods require two sensing devices.

The principal object of my invention is to provide an electronic tool gage to quickly determine the length and diameter of tools and storing the resultant data.

Another object of my invention is to provide an electronic glass scale readout device to attain accuracy.

Another object is to provide a portable unit with a tool rocket for receiving the tool to be electronically measured.

Another object is to provide an electronic device which reads the dimensions without human interference.

Another object of my invention is to provide a device wherein the measurements are read in inches or in meters.

Still another object of my invention is to utilize one sensing device to measure the diameter and length of a tool.

In general, my invention comprises a portable electronic measuring gage which comprises a cart having a column and a carriage slidable on the column. The carriage has air bearings which operate on the surfaces of the column and is provided with an arm for measuring diameters and length. The resultant information is generated from a glass scale by light beams which are transmitted to photo diodes and subsequently broken into square waves allowing for counting up or down. The tool is placed in a cachet which is so positioned that the tool can be contacted by a tip on a sensor arm to which is attached the measuring device. This information is sent to a digital readout from which the information may be stored or otherwise utilized.

My invention is illustrated in the accompanying drawings wherein I show, in

FIG. 1, a perspective view of the electronic tool gage.

Figure 2:
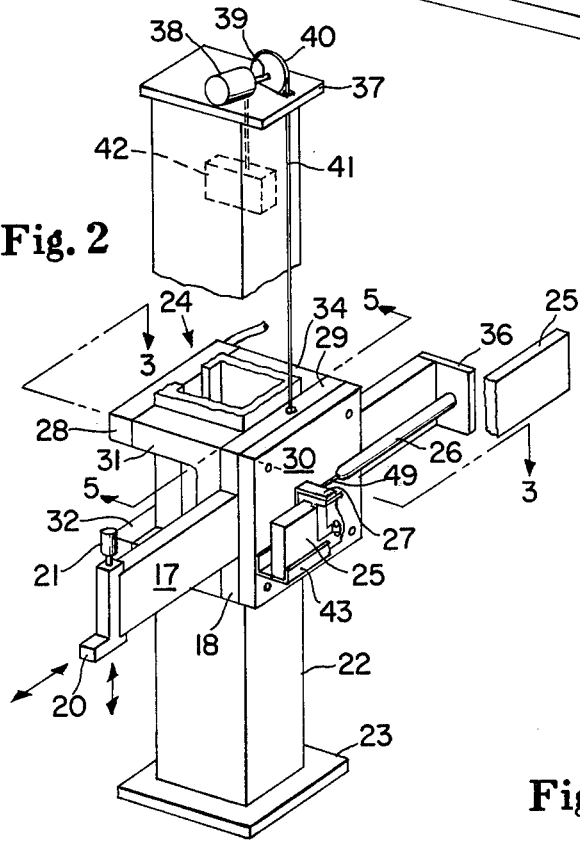
Figure 4:
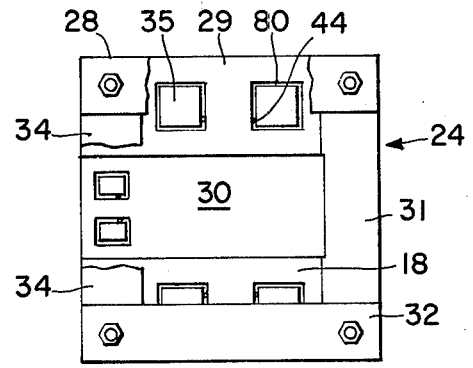
Figure 5:
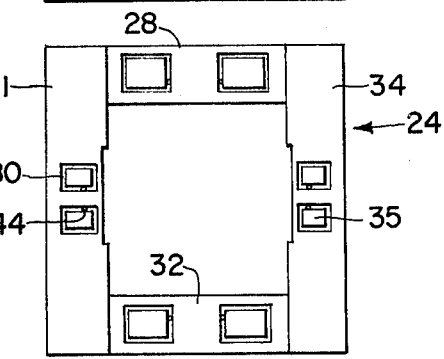
Figure 13:
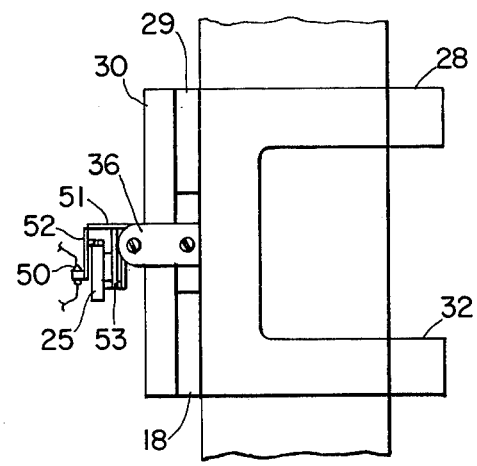
Figure 12:
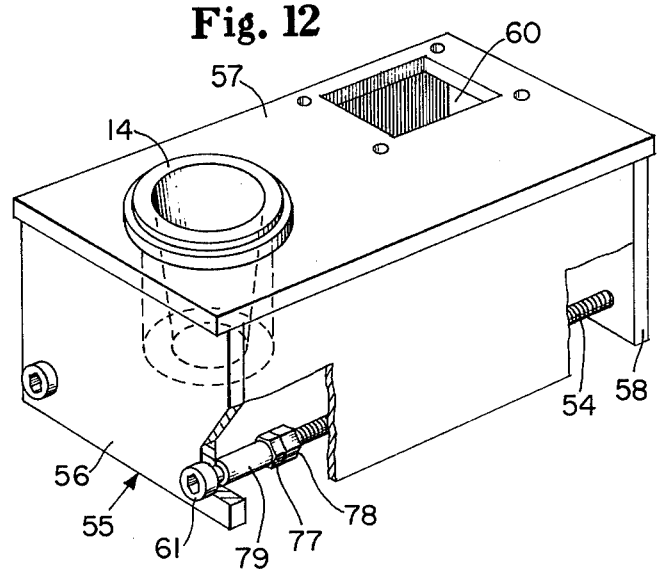
Figure 15:
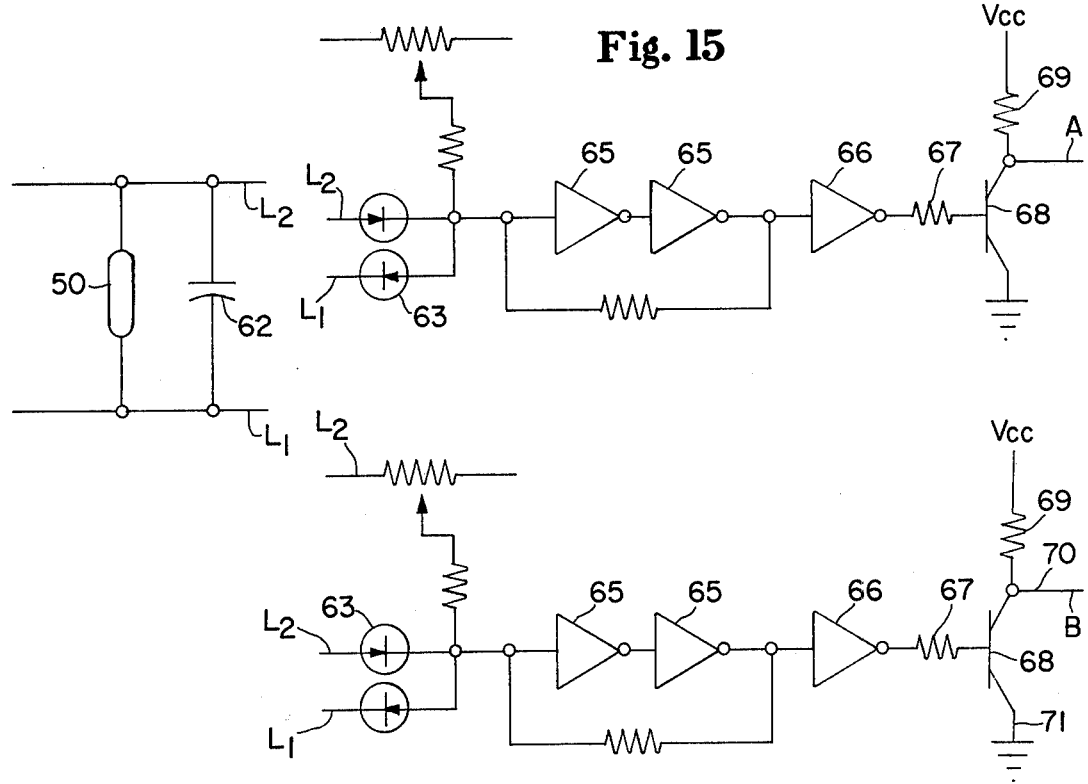
Figure 14:
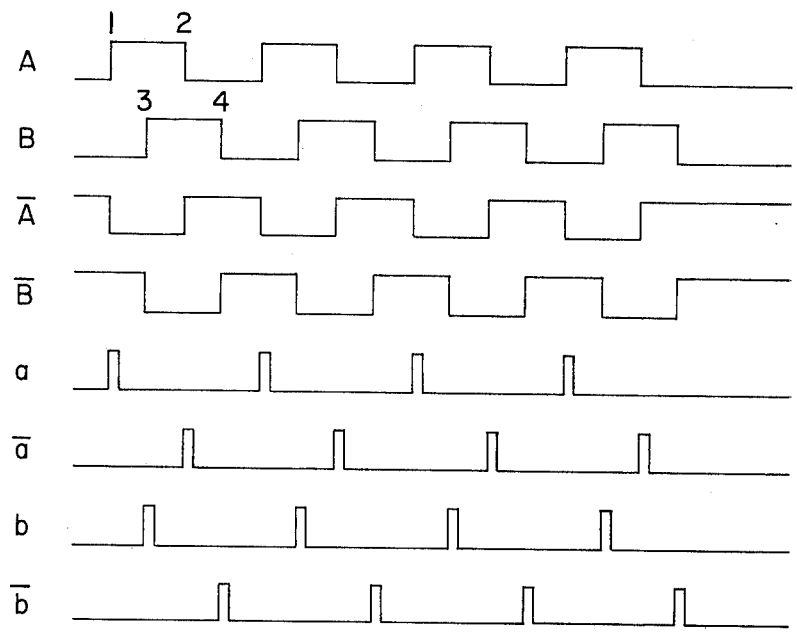

FIG. 2, a perspective view of the bearing carriage and column,

FIG. 3, a detailed sectional view taken along the lines of 3—3 of FIG. 2,

FIG. 4, a detailed sectional view of the air bearing carriage from the left side, FIG. 5, a detailed sectional view of the air bearing carriage from the right side, FIG. 6, a front view of the air bearing carriage, FIG. 7, a plan view of the arm support, FIG. 8, a view of a jewel mounted in an arm support, FIG. 9, a plan view of the glass scale and reading head, FIG. 10, an end view of the glass scale and reading head, FIG. 11, a right side view of the glass scale and reading head, FIG. 12, a perspective of the chassis with a portion broken away to show a tension-compression bolt, FIG. 13, a rear view of the air bearing carriage, FIG. 14, is a schematic showing the wave patterns, FIG. 15, if a wiring diagram.

In the drawings I show in FIG. 1 a cart 10 provided with coasters of wheels such as 12. The housing 13 has a slot through which a sensor arm 17 extends. The sensor arm 17 is moved manually in a vertical direction to accommodate a tool such as 15 which is secured within a tool socket 14 through a tool holder 16. The date is read through an electronic attachment 11 such as a digital readout and is mounted on the cart 10. A print out calculator 72 also may be provided. The power is supplied through a power line 73 and air through air line 74. Air line 74 has a quick disconnect fitting (not shown) for a conventional shop air supply, followed by a conventional check valve to insure against a reverse air blast when the line is disconnected. An air filter (not shown) of five micron or smaller insures clean drier air and a pressure regulator (not shown) maintains a constant working pressure. A small plastic air line (not shown) feeds the air bearing carriage 24. The data procured through measurement is entered into a computer through an umbilical cord 64 and is controlled by an entry button 19.

In FIG. 2 I show a view in perspective of the bracking carriage indicated generally at 24 and which is slidable on column 22. The column 22 is mounted on a chassis 55. The pad 23 is mounted on a chassis 55 having a top plate 57 as shown in FIG. 12. Referring to FIG. 2, the rectangular column 22 mounted through the shock absorbing pad 23 at its lower end is provided with a cap plate 37 at its upper end on which is mounted a generator 38 having a shaft 39 to which is secured a sheave 40 which carries a wire 41 one end of which is connected to an upper bearing 29 of the carriage 24. The other end of wire 41 is connected to a counterweight 42. The purpose of the generator 38 and wire 41 is to provide a means for controlling the movement of the carriage 24 on the column 22 in that voltage is generated through the movement of the sheave 40 to effect a signal to indicate excessive speed.

The carriage 24 has secured at its right side as illustrated in the drawings a horizontal glass scale 25. The glass scale 25 is secured to bearing cover plate 30 by bracket 43. The sensor arm 17 is movable in a horizontal plane between an upper bearing 29 and an arm support 18. Attached to the rear of arm 17 is an end plate 36 and a connecting rod 26 which has a connecting wire 49 which is attached to the electronic reading head 27. The horizontal movement of arm 17 causes the movement of the reading head 27 to move on glass scale 25 and electronically counting to indicate its position. The vertical movement of carriage 24 causes movement of wire 48 attached to bracket 51, which is secured to lamp holder 52. The electronic reading head 53 moves with bracket 51. (FIGS. 9, 10 and 11).

Referring to FIG. 3, I show the carriage 24, slidably mounted on hollow rectangular column 22. The carriage 24 is comprised of upper left bearing 28 and lower left bearing 32 (FIG. 6) and front bearing 31 and rear bearing 34 (FIG. 5). An upper bearing 29 is secured to front bearing 31 and rear bearing 34. A lower bearing is provided by arm support 18. The bearing cover plate 30 is mounted on upper bearing 29 and arm support 18. Within the column 22 is mounted a vertical glass scale 45 which is mounted within a glass scale housing 46 and is internally secured to the column 22. A counterweight 42 fits in the remaining space within column 22 and may extend into an opening 60 in chassis 55. A connecting wire 48 is connected to a junction box 75 which is held by a support such as 47 which is attached to upper left bearing 28 and lower left bearing 32. Vertical movement of the carriage 24 on column 22 causes movement of reading head 76 on glass scale 45. Reading head 76 slides on glass scale 45 to indicate the position of the carriage 24 which carries the sensor arm 17 having mounted thereon a tool tip 20. The tool, such as 15, to be gaged is secured by its holder 16 to socket 14. The arm 17 and tip 20 are manually positioned by movement of the knob 21.

The chassis top plate 57 is distorted for aligning the column 22 relative to the tool 15 by means of a tension-compression bolt 54 acting in conjunction with chassis front wall 56 and chassis back wall 58. The tension-compression bolt 54 consists of a bolt with a threaded end such as shown on 54, and a bushing 79 held on the bolt 54 by nut 77 and lock nut 78. For minute changes in the alignment of the tool 15 with the column 22 the tension-compression bolt 54 is adjusted by turning clockwise to move the tool away from column 22. In a counterclockwise movement of the bolt 54, the tool 15 is positioned closer to the column 22 at the top of the tool 15.

To secure the best alignment of the carriage 24 with the column 22, I utilize jewels such as 44 shown in FIG. 8 to meter air to the bearing such as 18 shown in FIG. 7. I provide 28 jewels each of which supplies a bearing to bearing member such as 18. In FIG. 4 the bearing jewel such as 44 lies within a trough such as 80 through which air is allowed to pass. This permits air in the trough 80 as well as in the interval area of the trough pattern to exert force on the adjacent bearing surface. The bearing area is indicated as pocket such as 35 in FIG. 4. I provide a high intensity lamp 50 in parallel with capacitor 62, which emits light through the glass scale such as horizontal glass scale 25, onto photodiodes such as 63 (FIG. 15). The movement of the sensor arm 17 causes movement of the reading head 27 on the glass scale 25 causing interrupted light pulses to be transmitted through two inverters 65 (FIG. 15), to generate square waves and spikes shown in FIG. 14 and then through an inverter buffer 66 through resistor 67 to transistor driver 68 where it is fed to a collector leg 70 and to resistor 69 and to ground 71. The waves shown in FIG. 14 are transmitted from the function gates (not shown) in a pattern producing square waves A and B through lines $L_1$ and $L_2$, to an up-down counter housed in electronic attachment 11 and may subsequently be interfaced with a computer. In the transmission of the waves A and B one of the photodiodes such as 63 is positioned 90° relative to the other to determine counting position up or down. The Vcc (FIG. 15) is a five volt supply which we have found adequate for our purposes. The entire device is carried on a cart 10 provided with wheels 12 for portability.

To measure a tool the operator first moves knob 21 attached to sensor tip 20 and arm 17 down contacting the top to tool socket 14 and presses a reset button on the face of electronic attachment 11 to establish a zero count position for the length. The diameter zero position is likewise made when tip 20 is set on the center line of the tool socket 14 using a center line gage (not shown). A number other than zero may be set on pre-set switches and entered on the pre-set button when a given compensation is needed in the tool length figure. After the gage is set up the operator places a tool holder 16 into socket 14 and lowers sensor tip 20 to contact tool 15 and then press button 19 to enter this tool length figure into the computer storage. On non-computer installations the visual readout number is manually entered into the proper tool compensation switches. A third choice is a strip print out of tool lengths by the self-contained computer printer for later use and for record.

Although the present invention has been described in its preferred embodiment, it is to be understood that modifications and variations may be resorted to without departing from the spirit and scope of the invention as those skilled in the art will readily understand. Such modifications and variations are considered to be within the purview and scope of the invention and appended claims.

Having thus described my invention, what I desire to secure by United States Letters Patent is:

1. An electronic tool gage device for measuring the length and/or diameter at selected points of tools used in machine tools, the gage device comprising a chassis within a portable cabinet, a column affixed to said chassis, a tool socket affixed to said chassis for receiving tools whose length and/or diameter is to be measured, a slidable carriage adapted to be moved vertically on said column, air bearings mounted on said carriage to give friction free movement between the said carriage and said column, a counter weight to balance said carriage, said carriage supporting a horizontal slidable arm, said carriage having air bearings to give friction free movement between the said arm and said carriage, a first sensing device mounted on said carriage for measuring the length of tools relative to said tool socket, a second sensing device mounted on said arm for measuring the diameter of tools relative to the center line of said tool socket, said sensing devices moving as a single unit, and means for visually displaying the length and/or diameter data.

* * * * *